United States Patent
Petersen

(10) Patent No.: US 7,930,738 B1
(45) Date of Patent: Apr. 19, 2011

(54) METHOD AND APPARATUS FOR SECURE EXECUTION OF CODE

(75) Inventor: Scott E. Petersen, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1174 days.

(21) Appl. No.: 11/144,512

(22) Filed: Jun. 2, 2005

(51) Int. Cl.
*G06F 7/04* (2006.01)

(52) U.S. Cl. .................. 726/16; 726/4; 726/14; 726/5; 713/190

(58) Field of Classification Search .................. 726/16
See application file for complete search history.

(56) References Cited

U.S. PATENT DOCUMENTS

| | | | | |
|---|---|---|---|---|
| 4,809,160 A | * | 2/1989 | Mahon et al. ...................... | 726/4 |
| 5,560,008 A | * | 9/1996 | Johnson et al. ..................... | 726/5 |
| 5,727,145 A | * | 3/1998 | Nessett et al. ...................... | 726/5 |
| 5,761,421 A | * | 6/1998 | van Hoff et al. ............... | 709/223 |
| 5,987,608 A | * | 11/1999 | Roskind .......................... | 726/14 |
| 6,986,052 B1 | * | 1/2006 | Mittal ........................... | 713/190 |
| 2002/0095578 A1 | * | 7/2002 | Yamada et al. ............... | 713/176 |
| 2002/0112179 A1 | * | 8/2002 | Riordan et al. ............... | 713/200 |
| 2002/0184520 A1 | * | 12/2002 | Bush et al. ..................... | 713/200 |
| 2003/0033539 A1 | * | 2/2003 | Cheng .......................... | 713/200 |
| 2003/0226031 A1 | * | 12/2003 | Proudler et al. ............... | 713/200 |
| 2004/0040017 A1 | * | 2/2004 | Kershenbaum et al. ....... | 717/158 |
| 2005/0108516 A1 | * | 5/2005 | Balzer et al. ................... | 713/150 |
| 2006/0101407 A1 | * | 5/2006 | Massarenti et al. ............ | 717/125 |

OTHER PUBLICATIONS

"Extensible Security Architectures for Java", Dan S. Wallach et al.*
Wallach, et al., "Extensible security architectures for Java", ACM SIGOPS Operating Systems Review, Proceedings of the sixteenth ACM symposium on operating systems principles SOSP '97. ACM Press.

* cited by examiner

*Primary Examiner* — Kambiz Zand
*Assistant Examiner* — Yonas Bayou
(74) *Attorney, Agent, or Firm* — Robert C. Kowert; Meyertons, Hood, Kivlin, Kowert & Goetzel, P.C.

(57) ABSTRACT

One embodiment of the present invention provides a system that facilitates secure execution of code. During operation, the system executes a section of code. Upon executing an instruction that raises a privilege of the section of code, the system checks if the section of code is trusted, wherein trusted code is allowed to raise the privilege and non-trusted code is not allowed to raise the privilege. If so, the system raises the privilege of the section of code and executes the section of code. After the section of code is executed, the system then lowers the privilege of the section of code.

20 Claims, 2 Drawing Sheets

METHOD AND APPARATUS FOR SECURE EXECUTION OF CODE

BACKGROUND

1. Field of the Invention

The present invention relates to computer systems. More specifically, the present invention relates to a method and an apparatus for facilitating the secure execution of code within a computer system.

2. Related Art

Since the early years of computer programming, computer designers have strived to create open platforms with robust feature sets while minimizing the ability for hackers to execute malicious code. To this end, programmers have created the notion of "privileged" code to help safeguard against the malicious use of code. In theory, the programmers must specifically mark privileged code, and only code that is marked as privileged is allowed to execute potentially dangerous functions. In practice, however, hackers are able to fool such systems into thinking that their code is privileged through various methods. For example, many hackers exploit privilege inheritance vulnerabilities to gain access to higher privileges. Essentially, they fool the system into calling their code from a privileged function, and in turn, their code inherits the access level of the calling function.

Another way in which hackers can fool the system into executing their rogue code is by replacing a system function with their own corresponding function. Subsequently, when the system attempts to execute the system function, the hacker's function executes instead; often times with all of the access rights of the replaced system function.

It is possible to manually inspect code to identify such vulnerabilities and compromised code. However, with all of the different levels of privilege inheritance, and all of the complex procedure calls, it can be very easy to overlook potential problems.

Hence, what is needed is a method and an apparatus for securely executing code without the problems described above.

SUMMARY

One embodiment of the present invention provides a system that facilitates secure execution of code. During operation, the system executes a section of code. Upon executing an instruction that raises a privilege of the section of code, the system checks if the section of code is trusted, wherein trusted code is allowed to raise the privilege and non-trusted code is not allowed to raise the privilege. If so, the system raises the privilege of the section of code and executes the section of code. After the section of code is executed, the system then lowers the privilege of the section of code.

In a variation of this embodiment, raising the privilege of the section of code involves setting a privilege bit for the section of code on a stack.

In a variation of this embodiment, checking if the section of code is trusted further involves determining if a function containing the section of code is trusted by checking it against a core library of trusted functions.

In a variation of this embodiment, checking if the section of code is trusted further involves determining if a function containing the section of code is a trust propagator. If so, the system examines a preceding stack frame on the stack to determine if a preceding function which called the function is trusted.

In a variation of this embodiment, the section of code is written in a scripting language that is executed by an interpreter.

In a further variation, the scripting language is JavaScript.

In a variation of this embodiment, the section of code is embedded in an Adobe® Portable Document Format (PDF) document.

DETAILED DESCRIPTION

Figure 1:
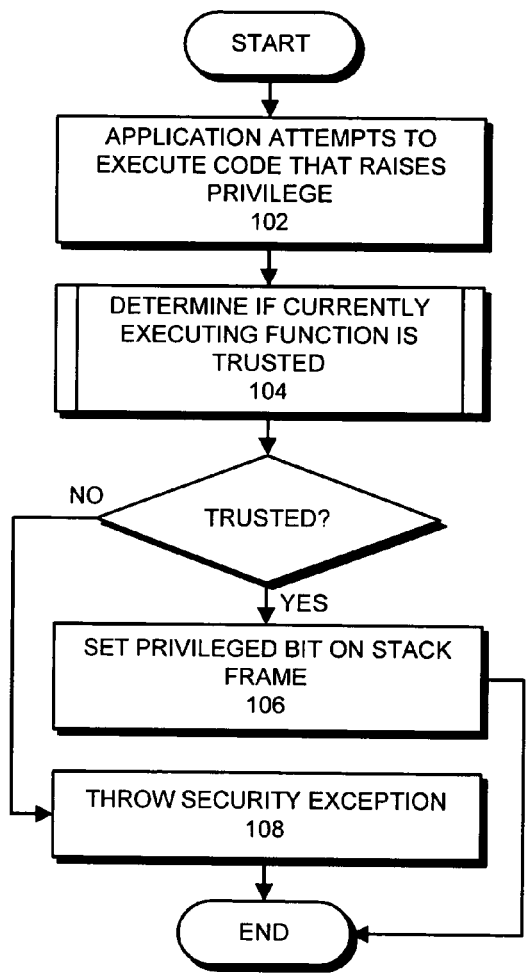
FIG. 1 presents a flowchart illustrating the process of securely executing code in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

There are several ways of achieving transition between privileged and unprivileged code that are used today. It is common, through various means, to give a function (or method or whatever you want to call it) privilege regardless of how it is called. A typical example is the native code backing a JavaScript method that is available to web pages in a browser. Nefarious JavaScript code can alter the native code or leverage the native code to gain unauthorized access.

The reverse can also be true. Native code might set some state that allows JavaScript executing while that state is set to have more privilege than it normally would. This is typical of an application that is written partly in a scripting language, which is also available to dubious sources like web pages or Adobe® Portable Document Format (PDF) files.

Mixing and matching privilege in is inherently dangerous. In most scenarios, accidental privilege 'leakage' is a serious concern. Most techniques for determining if the code is secure require full static analysis to decide if privilege is leaking. In addition, code from third parties is often error prone and hard to audit.

Rather than granting privilege to something as coarse as a function, in one embodiment of the present invention, privilege is explicitly raised (additional capabilities are granted) for a small number of lines of code. This helps to ensure that privilege is raised only for the operations that truly require raised privilege. In addition, privilege is not inherited by functions called while privilege is raised. This drastically reduces the opportunity for privilege leakage.

Each function must explicitly raise privilege regardless of whether or not code with privilege is calling it. In addition, only in two cases is a function allowed to raise privilege. The first case is an explicitly trusted function. An explicitly trusted function can manipulate privilege as it sees fit. A trusted function would generally be a function that performs an operation that is not exploitable overall but may require privilege for certain steps of its operation. Note that the trusted function must still explicitly raise privilege and functions that it calls are not necessarily trusted or privileged. In one embodiment of the present invention, an explicitly trusted function is indicated as such in an core library that cannot be altered by the executing code. In this manner, there is no way that executing code can mark itself as explicitly trusted.

The second case is "trust-propagating functions." These function are allowed to manipulate privilege only if called by either a trusted function or by another trust propagator that has received propagated trust from a trusted function. Note that any number of trust propagators can be chained after a trusted function and are still able to propagate privilege. Note that a trust propagator function is typically be used to implement auxiliary behaviors for a trusted function.

Since privilege is not inherited, and trust is inherited only by functions explicitly marked as able to inherit trust, rogue code is by definition incapable of gaining privilege. Furthermore, privileged operations must always be performed when privileged is explicitly raised. In this way, auditing becomes a simple matter of searching a codebase for whatever method or construct raises privilege. It is even perfectly safe for a trusted function to call another function provided by a dubious source like a PDF file even if the trusted function has raised privilege. In this case, the function would not be trusted or be a trust propagator, and any privilege would not be inherited.

In one embodiment of the present invention, the Acrobat™ application uses the described methods for JavaScript privilege management. The system simply sets private data on function objects indicating if they are trusted or are trust propagator functions. When privilege is raised, the system sets private data on the JavaScript execution engine's stack frame objects to indicate that the currently executing stack frame has privilege.

Secure Execution of Code

FIG. 1 presents a flowchart illustrating the process of secure execution of code in accordance with an embodiment of the present invention. The system starts by attempting to execute code that raises privilege (step 102). The system then determines if the currently executing function is trusted (step 104). Note that determining trust is explained in detail in FIG. 3. If the currently executing function is indeed trusted, the system sets a privileged bit on the stack frame (step 106). Note that implementing this technique through the stack frame is important because the stack frame cannot be manipulated directly by the code executing within the system. Only the native code of the system itself can manipulate the stack frame. If such code was able to manipulate the stack directly, then it would already have access ability well beyond the scope of the present invention and could carry out any number of nefarious activities.

If the currently executing instruction is not trusted, then the system throws a security exception (step 108) and subsequently does not execute the code. Optionally, the system can carry out any number of activities when non-trusted code attempts to raise privilege, such as notifying the user, notifying an administrator, and creating an entry in a security log.

Determining Function Trust Level

Figure 2:
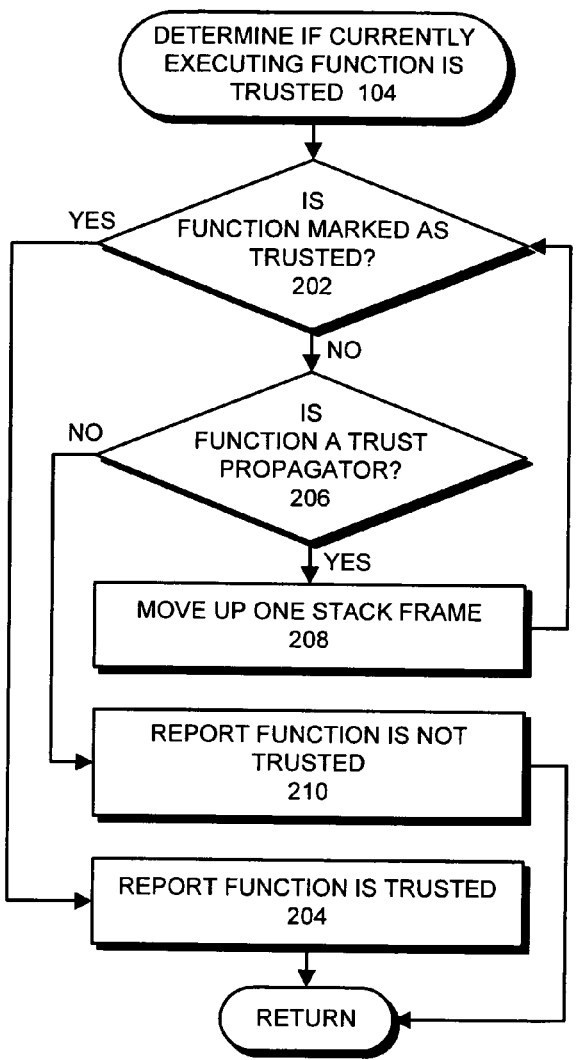
FIG. 2 presents a flowchart illustrating the process of determining the trust level of a function in accordance with an embodiment of the present invention.

FIG. 2 presents a flowchart illustrating the process of determining trust level of a function in accordance with an embodiment of the present invention. The system starts by determining if the function is marked as trusted by checking the function against a core library (step 202). If so, the system returns that the function is trusted (step 204). However, if the function is not marked as trusted, the system then determines if the function is a trust propagator (step 206). If so, the system moves up one stack frame (step 208) and starts over at step 202, determining if the new function is trusted. If at any point before determining that the function is trusted the system determines that the function is not a trust propagator, then the system reports that the function is not trusted (step 210). In short, in order to be trusted, the function needs to be marked as trusted, or be part of an unbroken chain of trust propagators to a function that is trusted.

Computer System with Secure Code Execution

Figure 3:
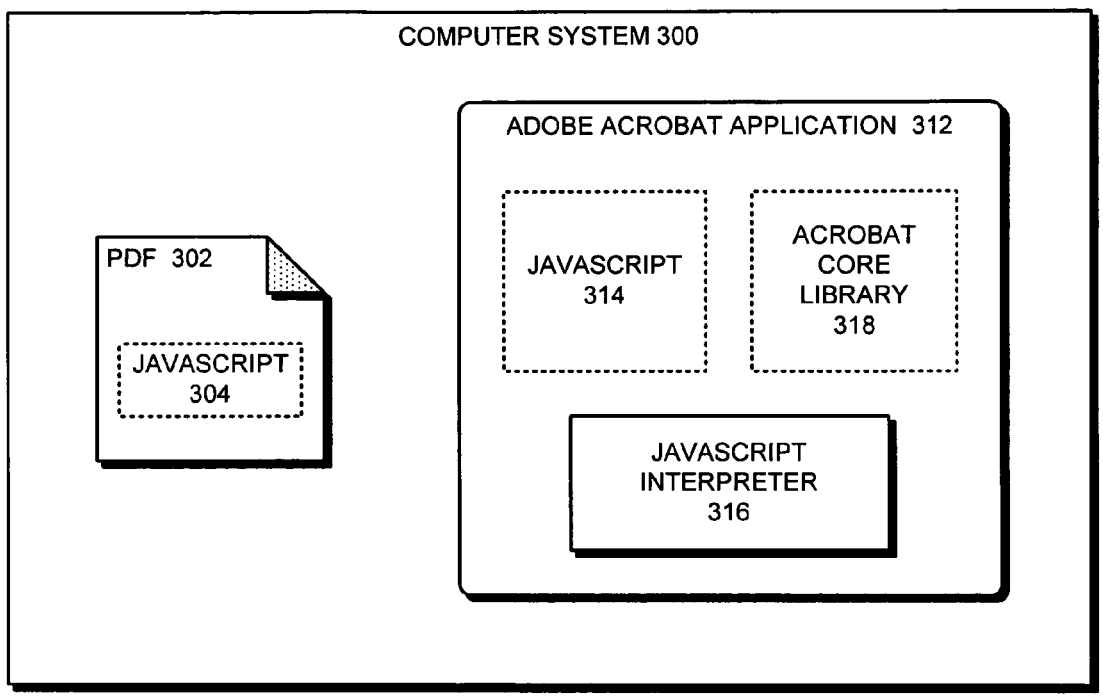
FIG. 3 illustrates a computer system with secure code execution in accordance with an embodiment of the present invention.

FIG. 3 illustrates a computer system 300 with secure code execution in accordance with an embodiment of the present invention. Computer system 300 can generally include any type of computer system, including, but not limited to, a computer system based on a microprocessor, a mainframe computer, a digital signal processor, a portable computing device, a personal organizer, a device controller, and a computational engine within an appliance.

Computer system 300 includes the Adobe Acrobat application 312 that is used to create and display Adobe® Portable Document Format (PDF) documents, such as PDF 302. In addition, PDF document may contain some scripting language code such as JavaScript 304.

Adobe Acrobat™ application 312 includes JavaScript 314, JavaScript interpreter 316 (for interpreting JavaScript 314, as well as JavaScript 304 when PDF 302 is opened by Adobe Acrobat™ application 312), and Acrobat™ core library 318. In the past, hackers could potentially fool Adobe Acrobat™ application 312 into executing malicious code by placing the malicious code into JavaScript 304 and opening PDF 302 in Adobe Acrobat™ application 312. In one embodiment of the present invention, Adobe Acrobat™ application 312 safeguards itself by using the methods described in FIGS. 1 and 2. All code in JavaScript 304 and 314 must explicitly raise privilege when executing code that requires higher access. In order to raise privilege, the executing code must be either explicitly trusted in Acrobat™ core library 318, or must be a trust propagator and be part of an unbroken chain of trust propagators back to a function that is trusted by Acrobat™ core library 318. Note that Acrobat™ core library 318 cannot be modified by JavaScript 304 or JavaScript 314.

The specification discusses code that is either trusted or not trusted by checking a single privilege bit. Note that the present invention is not limited to a binary trusted/not trusted operation or a single bit. In one embodiment of the present invention, multiple privilege bits are used for each function to determine various levels of trust.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclo-

What is claimed is:

1. A method, comprising:

executing a trusted section of code on a computer, said executing comprising executing one or more instructions to explicitly raise a privilege level of the trusted section of code to an elevated privilege level, wherein:

the elevated privilege level is necessary to execute a restricted function that is not executable by the trusted section of code before raising the privilege level to the elevated level, and the raising of privilege level is dependent, at least in part, on determining that the trusted section of code is trusted to raise the privilege level to the elevated level; and:

while the privilege level of the trusted section of code is at the elevated level, the trusted section of code invoking a given function comprising a second section of code, wherein the second section of code does not inherit from the trusted section, the elevated privilege level necessary to execute the restricted function.

2. The method of claim 1, wherein raising the privilege level involves setting a privilege bit for the trusted section of code on a call stack of a computer program.

3. The method of claim 1, wherein the determination that the trusted section of code is trusted is dependent, at least in part, on determining that a function comprising the trusted section of code is indicated as explicitly trusted in a core library that cannot be modified by the trusted section of code.

4. The method of claim 1, further comprising:

executing one or more instructions in the second section of code to explicitly raise a level of privilege of the second section of code to the elevated privilege level necessary to execute the restricted function;

wherein the raising is dependent, at least in part, on a determination that the second section of code is trusted to raise the privilege level to the elevated level;

wherein the determination that the second section of code is trusted is dependent, at least in part, on:

determining that the function comprising the second section of code is a trust propagator; and determining that the trusted section of code that invoked the function is trusted.

5. The method of claim 1, wherein the trusted section of code or the second section of code is written in a scripting language that is executed by an interpreter.

6. The method of claim 5, wherein the scripting language is JavaScript.

7. The method of claim 1, wherein the trusted section of code or the second section of code is embedded in an Adobe® Portable Document Format (PDF) document.

8. A computer-readable storage medium storing instructions that when executed by a computer cause the computer to perform a method comprising:

executing a trusted section of code on a computer, said executing comprising executing one or more instructions to explicitly raise a privilege level of the trusted section of code to an elevated privilege level, wherein:

the elevated privilege level is necessary to execute a restricted function that is not executable by the trusted section of code before raising the privilege level to the elevated level, and the raising of privilege level is dependent, at least in part, on determining that the trusted section of code is trusted to raise the privilege level to the elevated level; and:

while the privilege level of the trusted section of code is at the elevated level, the trusted section of code invoking a given function comprising a second section of code, wherein the second section of code does not inherit from the trusted section, the elevated privilege level necessary to execute the restricted function.

9. The computer-readable storage medium of claim 8, wherein raising the privilege level involves setting a privilege bit for the trusted section of code on a call stack of a computer program.

10. The computer-readable storage medium of claim 8, wherein the determination that the trusted section of code is trusted is dependent, at least in part, on determining that a function comprising the trusted section of code is indicated as explicitly trusted in a core library that cannot be modified by the trusted section of code.

11. The computer-readable storage medium of claim 8, wherein the method further comprises:

executing one or more instructions in the second section of code to explicitly raise a level of privilege of the second section of code to the elevated privilege level necessary to execute the restricted function;

wherein the raising is dependent, at least in part, on a determination that the second section of code is trusted to raise the privilege level to the elevated level;

wherein the determination that the second section of code is trusted is dependent, at least in part, on:

determining that the function comprising the second section of code is a trust propagator; and determining that the trusted section of code that invoked the function is trusted.

12. The computer-readable storage medium of claim 8, wherein the trusted section of code or the second section of code is written in a scripting language that is executed by an interpreter.

13. The computer-readable storage medium of claim 12, wherein the scripting language is JavaScript.

14. The computer-readable storage medium of claim 8, wherein the trusted section of code or the second section of code is embedded in an Adobe® Portable Document Format (PDF) document.

15. A computer, comprising:

a computer-readable storage medium storing instructions thereon for implementing a method comprising:

executing a trusted section of code on a computer, said executing comprising executing one or more instructions to explicitly raise a privilege level of the trusted section of code to an elevated privilege level, wherein:

the elevated privilege level is necessary to execute a restricted function that is not executable by the trusted section of code before raising the privilege level to the elevated level, and the raising of privilege level is dependent, at least in part, on determining that the trusted section of code is trusted to raise the privilege level to the elevated level; and:

while the privilege level of the trusted section of code is at the elevated level, the trusted section of code invoking a given function comprising a second section of code, wherein the second section of code does not inherit from the trusted section, the elevated privilege level necessary to execute the restricted function.

16. The computer of claim 15, wherein raising the privilege level involves setting a privilege bit for the trusted section of code on a call stack of a computer program.

17. The computer of claim 15, wherein the determination that the trusted section of code is trusted is dependent, at least in part, on determining that a function comprising the trusted section of code is indicated as explicitly trusted in a core library that cannot be modified by the trusted section of code.

18. The computer of claim 15, wherein the method further comprises:

executing one or more instructions in the second section of code to explicitly raise a level of privilege of the second section of code to the elevated privilege level necessary to execute the restricted function;

wherein the raising is dependent, at least in part, on a determination that the second section of code is trusted to raise the privilege level to the elevated level;

wherein the determination that the second section of code is trusted is dependent, at least in part, on:

determining that the function comprising the second section of code is a trust propagator; and determining that the trusted section of code that invoked the function is trusted.

19. The computer of claim 15, wherein the trusted section of code or the second section of code is written in a scripting language that is executed by an interpreter.

20. The computer of claim 15, wherein the trusted section of code or the second section of code is embedded in an Adobe® Portable Document Format (PDF) document.

* * * * *